(12) United States Patent
Jankovic et al.

(10) Patent No.: US 6,604,412 B2
(45) Date of Patent: Aug. 12, 2003

(54) SENSOR DIAGNOSTICS

(75) Inventors: Mrdjan J. Jankovic, Birmingham, MI (US); Julia Voutyras, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/202,776

(22) Filed: Jul. 25, 2002

(65) Prior Publication Data
US 2003/0074960 A1 Apr. 24, 2003

Related U.S. Application Data

(62) Division of application No. 09/682,783, filed on Oct. 18, 2001.

(51) Int. Cl.[7] .............................................. G01M 15/00
(52) U.S. Cl. .................................................... 73/118.1
(58) Field of Search .................... 73/118.1; 60/274–278, 60/285–295; 477/169, 176; 701/29, 34

(56) References Cited

U.S. PATENT DOCUMENTS

| | | | | |
|---|---|---|---|---|
| 5,018,383 A | * | 5/1991 | Togai et al. ................ 73/118.1 |
| 6,217,481 B1 | * | 4/2001 | Watanabe et al. ........... 477/169 |
| 6,427,109 B1 | * | 7/2002 | Doering et al. ................ 701/54 |

* cited by examiner

*Primary Examiner*—Kamand Cuneo
*Assistant Examiner*—Monica D. Harrison
(74) *Attorney, Agent, or Firm*—Julia Voutyras; Allan J. Lippa

(57) ABSTRACT

A method for obtaining an accurate cylinder air-charge estimate is presented. First, a sensor-based powertrain torque estimate is obtained. Next, a torque converter-based powertrain torque estimate is obtained when the torque converter clutch is unlocked. The two estimates are compared, and if they differ by more than a predetermined amount, sensor drift is diagnosed, and corrected.

13 Claims, 4 Drawing Sheets

SENSOR DIAGNOSTICS

CROSS-REFERENCE TO RELATED APPLICATIONS

This application is a divisional of co-pending U.S. patent application Ser. No. 09/682,783 entitled "Sensor Diagnostics", filed on Oct. 18, 2001.

FIELD OF INVENTION

The present invention relates generally to a system and a method of obtaining an accurate cylinder air-charge estimate in a vehicle equipped with an engine coupled to a torque converter, and more particularly to correcting in-range drifting of a sensor providing a signal indicative of a cylinder air-charge.

BACKGROUND OF THE INVENTION

Vehicles usually have powertrains comprising an internal combustion engine coupled to a torque converter coupled to an automatic transmission.

Typically, such vehicles also include a controller for estimating powertrain torque in order to better control vehicle performance. The powertrain torque estimate may be heavily dependent on a cylinder air-charge estimate, which may be obtained based on the information provided by a mass airflow (MAF) or a manifold air pressure (MAP). However, the inventors herein have recognized that the air-charge estimate may become inaccurate due to the sensors' electrical degradation or contamination by oil and dust particle settlement, which will cause their signal to exhibit an in-range drift. This, the in-range drifting of the sensor signal may degrade a torque-based powertrain control strategy's estimate of torque.

The inventors herein have recognized that an alternative estimate of the powertrain torque could be obtained based on torque converter characteristics when the torque converter clutch is unlocked. The accuracy of this estimate is affected mainly by the variations of the torque converter ratio (which depend on the converter design tolerances), and may be more accurate than the sensor-based estimate. Further, the inventors have recognized that in-range drifting of the sensor can be diagnosed and corrected by comparing the torque converter-based powertrain torque estimate and the sensor-dependent powertrain torque estimate.

SUMMARY OF THE INVENTION

In carrying out the features and advantages of the present invention, a method for estimating an amount of air inducted into a cylinder of an internal combustion engine disposed in a vehicle, the vehicle further having a torque converter coupled between the engine and a transmission, includes: determining an estimate of a transmission input torque based on a torque converter characteristic: determining a first estimate of the inducted air amount based on said transmission input torque estimate; determining a second estimate of the inducted air amount based on a sensor signal; and adjusting said second estimate based on said first estimate.

In other words, this method utilizes estimating cylinder air-charge from a torque converter-based powertrain torque estimate, and using it to correct the sensor-based estimate.

An advantage of the above aspect of invention is that increased precision in the cylinder air-charge estimate will result in improved torque control, fuel economy and emission control.

In another aspect of the present invention a system for diagnosing a sensor capable of providing a signal indicative of an amount of air inducted into a cylinder of an internal combustion engine, the system comprising: the sensor; the engine; a transmission; a torque converter coupled between the engine and said transmission; and a controller for determining a torque estimate based on a torque converter characteristic, determining a first inducted air amount estimate based on said torque estimate, determining a second inducted air amount estimate based on a sensor signal; said controller comparing said first estimate to said second estimate and providing an indication of sensor degradation based on a result of said comparison.

In other words, sensor signal drifting can be diagnosed by comparing a torque converter-based torque estimate to a sensor-based torque estimate. The sensor signal can then be corrected, or, alternatively, sensor decontamination can be performed.

An advantage of the above aspect of the invention is improved vehicle drivability, fuel economy and emission control.

The above advantages and other advantages and features of the present invention will be readily apparent from the following detailed description of the preferred embodiments when taken in connection with the accompanying drawings.

BRIEF DESCRIPTION OF THE DRAWINGS

The objects and advantages described herein will be more fully understood by reading an example of an embodiment in which the invention is used to advantage, referred to herein as the Description of Preferred Embodiment, with reference to the drawings, wherein.

DESCRIPTION OF PREFERRED EMBODIMENT(S)

As will be appreciated by those of ordinary skill in the art, the present invention is independent of the particular underlying engine technology and configuration. As such, the present invention may be used in a variety of types of internal combustion engines, such as conventional engines, in addition to direct injection stratified charge (DISC) or direct injection spark ignition engines (DISI).

Figure 1:
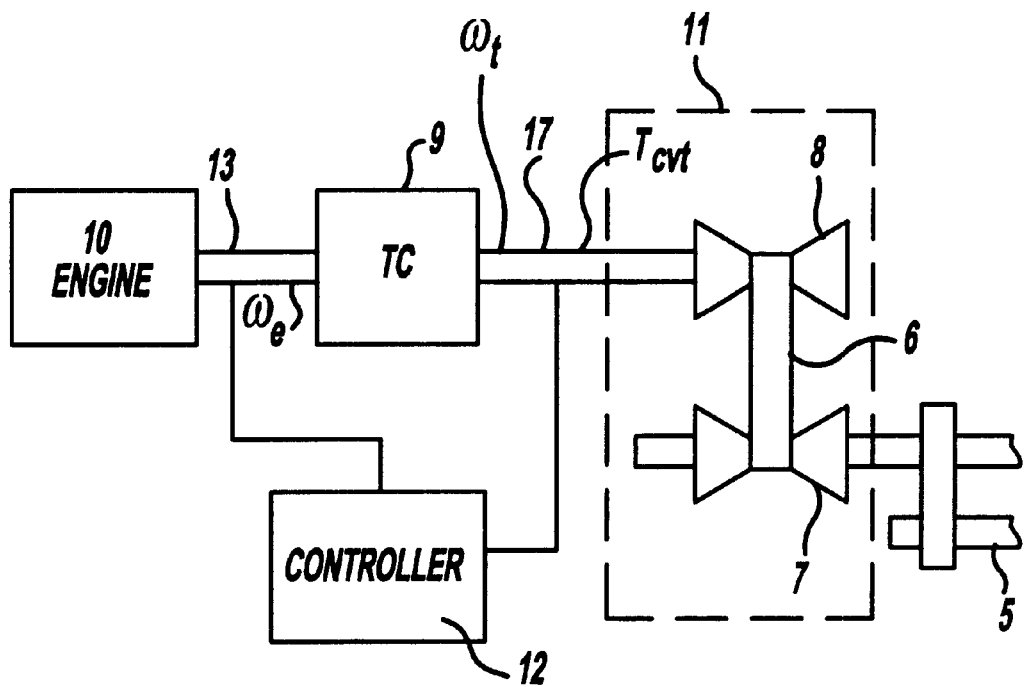
FIG. 1 is a block diagram of a vehicle illustrating various components related to the present invention.
Figure 2:
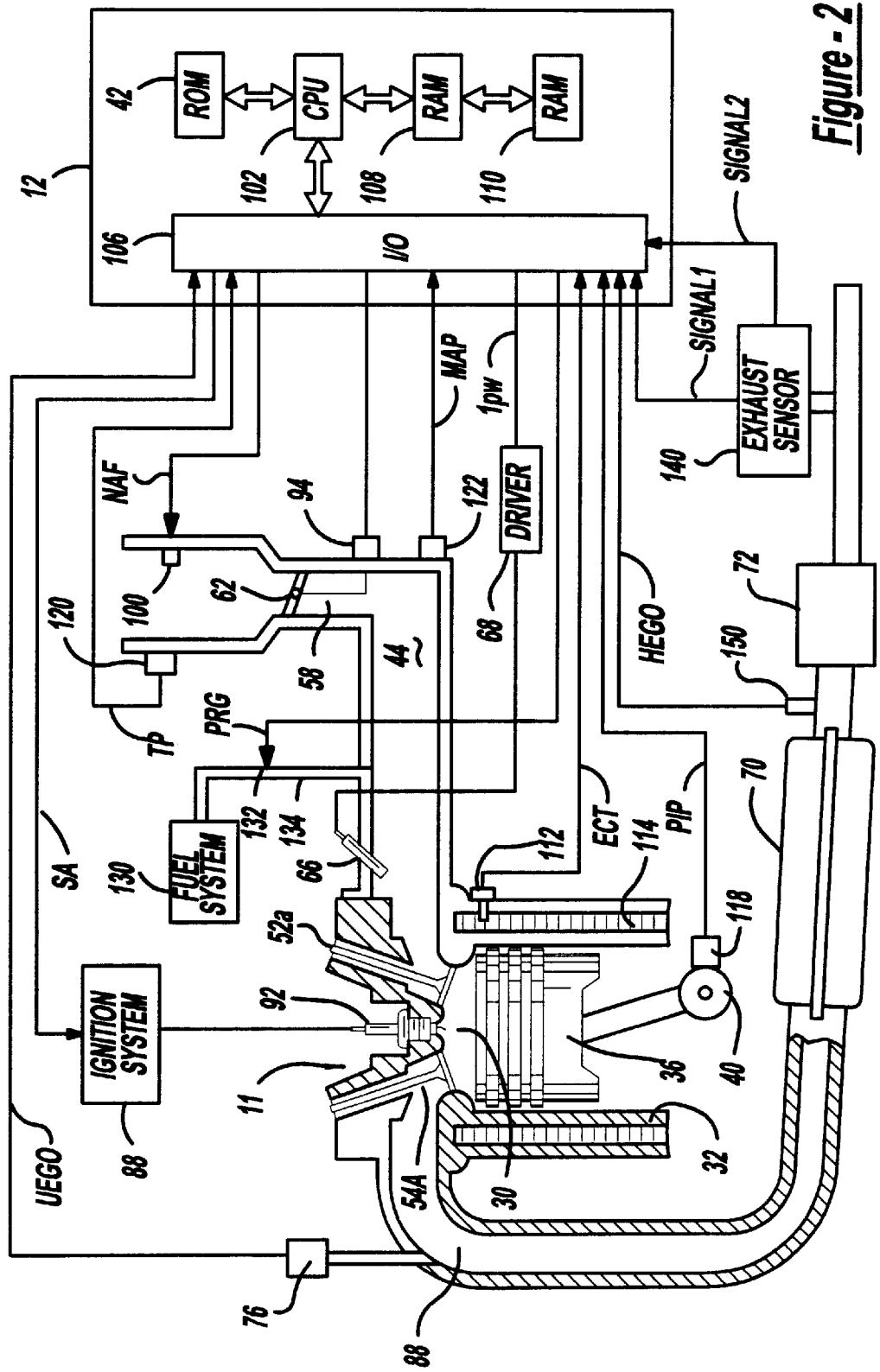
FIG. 2 is a block diagram of an engine in which the invention is used to advantage.

A block diagram illustrating an engine control system and method for a representative internal combustion engine according to the present invention is shown in FIG. 1. Preferably, internal combustion engine 10, further described herein with particular reference to FIG. 2, is shown coupled to torque converter 9 via crankshaft 13. Torque converter 9 is also coupled to transmission 11 via turbine shaft 17, which is also known as a transmission input shaft. Torque converter 9 has a bypass clutch (not shown), which can be engaged, disengaged, or partially engaged. When bypass clutch is disengaged, torque converter 9 is said to be in an unlocked state. Transmission 11 is an electronically controlled continuously variable transmission (CVT), comprising an input pulley 8 having a radius $R_i$ that is adjusted relative to the radius $R_o$ of an output pulley 7, affecting the movement of a belt 6, and thus providing a continuously variable transmission gear ratio to a drive axle 5. Both the input and the output pulleys are equipped with pulley speed sensors (not shown), which provide signals that are used in determining transmission ratio. The winding radius of the belt is changed by applying hydraulic pressures to the input and output pulleys. Alternatively, transmission 11 could be a conventional automatic transmission having a finite number of gear ratios.

Internal combustion engine 10 having a plurality of cylinders, one cylinder of which is shown in FIG. 2, is controlled by electronic engine controller 12. Engine 10 includes combustion chamber 30 and cylinder walls 32 with piston 36 positioned therein and connected to crankshaft 13. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20. In a preferred embodiment, sensor 16 is a HEGO sensor as is known to those skilled in the art.

Intake manifold 44 communicates with throttle body 64 via throttle plate 66. Throttle plate 66 is controlled by electric motor 67, which receives a signal from ETC driver 69. ETC driver 69 receives control signal (DC) from controller 12. Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown).

Engine 10 further includes conventional distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass air flow (MAF) from mass air flow sensor 110 coupled to throttle body 64 (alternatively, inducted air flow can be determined form a manifold absolute pressure (MAP) sensor located in the engine intake manifold, and engine speed); engine coolant temperature (ECT) from temperature sensor 112 coupled to cooling jacket 114; a measurement of throttle position (TP) from throttle position sensor 117 coupled to throttle plate 66; a measurement of turbine speed ($W_t$) from turbine speed sensor 119, where turbine speed measures the speed of shaft 17, and a profile ignition pickup signal (PIP) from Hall effect sensor 118 coupled to crankshaft 13 indicating an engine speed ($W_e$). Alternatively, turbine speed may be determined from vehicle speed and gear ratio.

Continuing with FIG. 2, accelerator pedal 130 is shown communicating with the driver's foot 132. Accelerator pedal position (PP) is measured by pedal position sensor 134 and sent to controller 12.

In an alternative embodiment, where an electronically controlled throttle is not used, an air bypass valve (not shown) can be installed to allow a controlled amount of air to bypass throttle plate 62. In this alternative embodiment, the air bypass valve (not shown) receives a control signal (not shown) from controller 12.

Figure 3A:
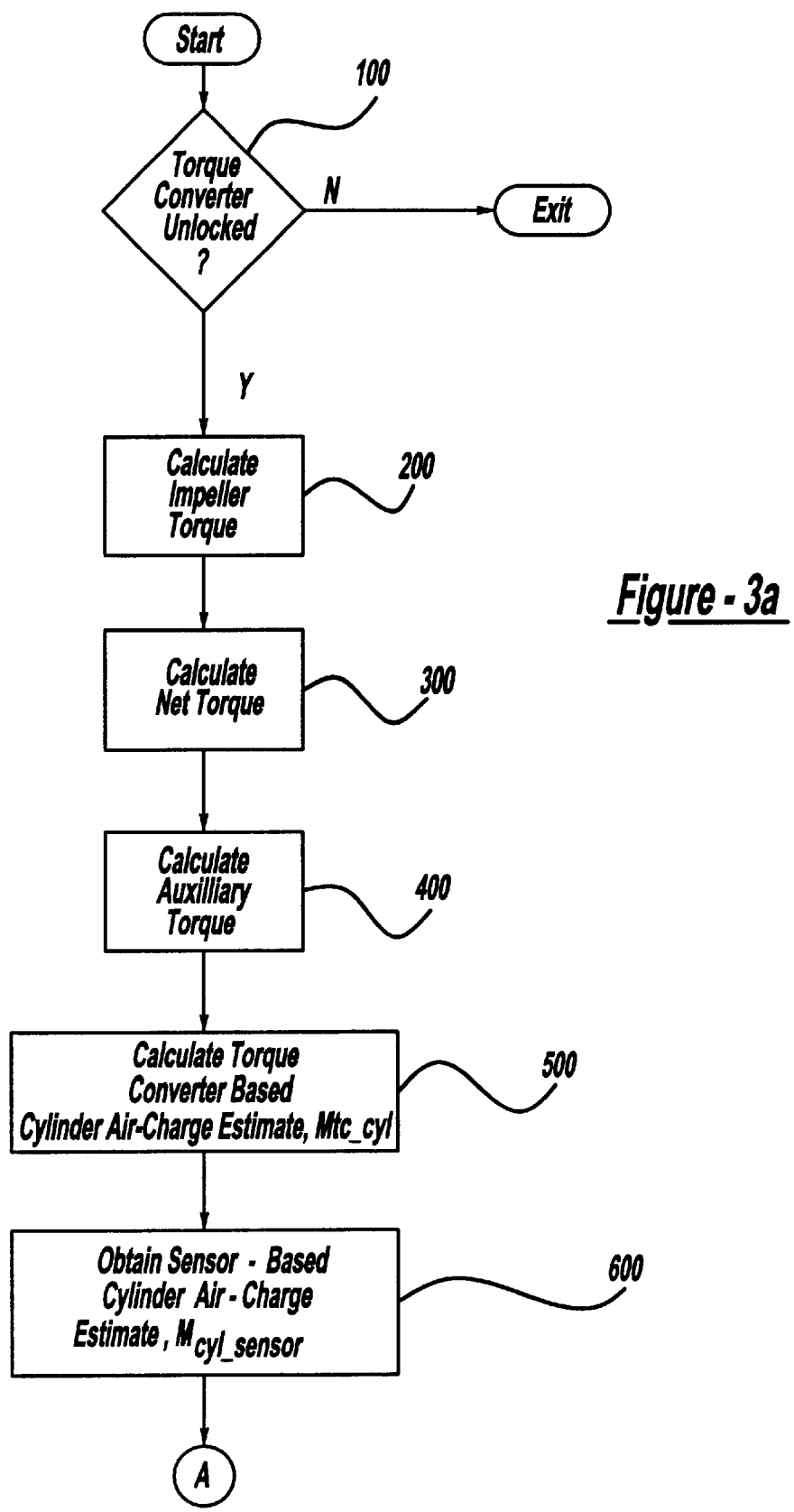
FIG. 3 is a block diagram of an example of an embodiment in which the invention is used to advantage.
Figure 3B:
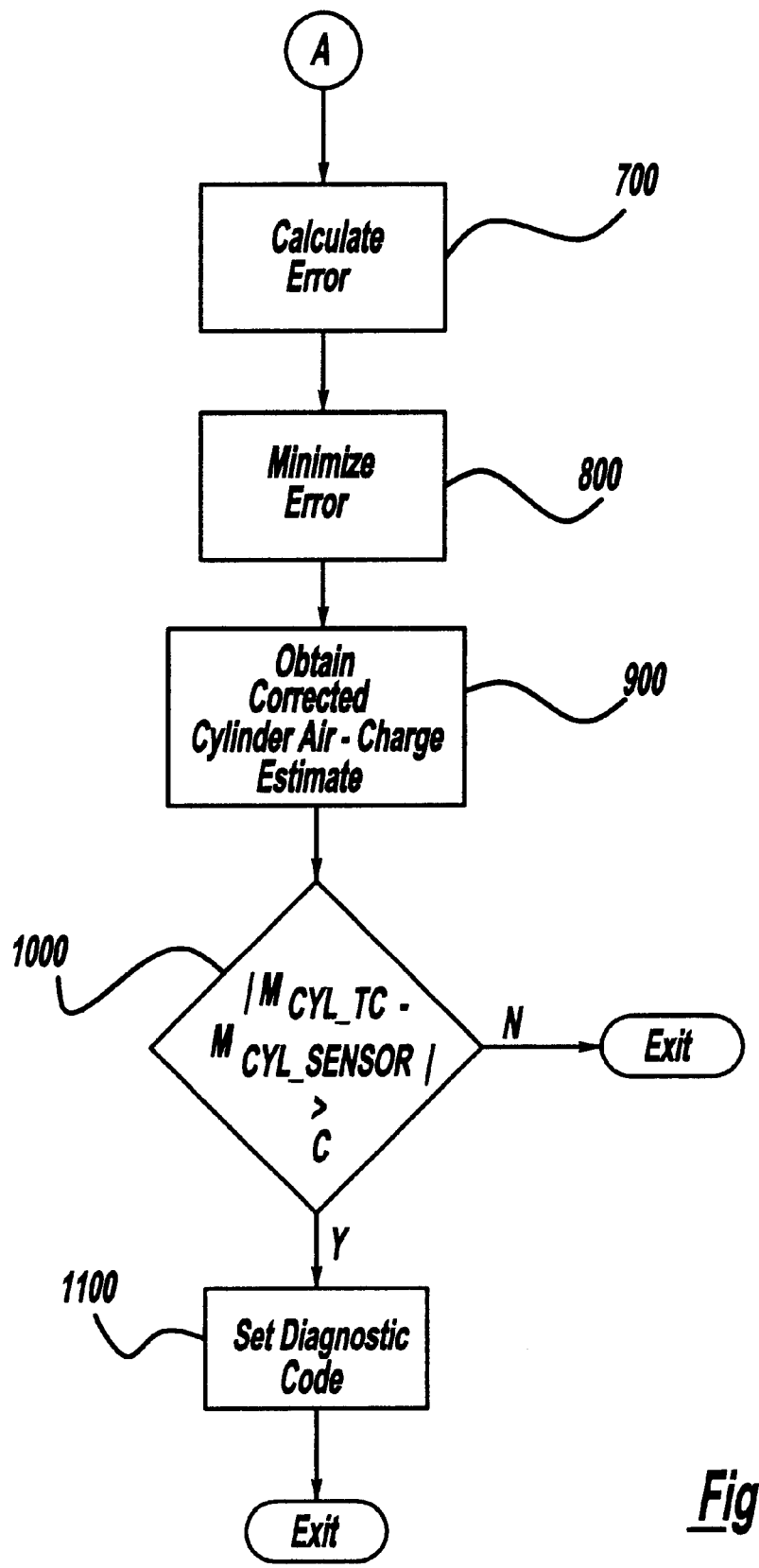

The diagram in FIG. 3 generally represents operation of one embodiment of a system or method according to the present invention. As will be appreciated by one of ordinary skill in the art, the diagram may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features and advantages of the invention, but is provided for ease of illustration and description. Although not explicitly illustrated, one of ordinary skill in the art will recognize that one or more of the illustrated steps or functions may be repeatedly performed depending on the particular strategy being used.

Referring now to FIG. 3, the routine begins in step 100 wherein a decision is made whether the torque converter clutch is locked. If the answer to step 100 is YES, the routine exits. If the answer to step 100 is NO, the routine proceeds to step 200 wherein $T_{imp}$, a torque converter-based estimate of the impeller torque, is determined based on a torque converter capacity factor which is a function of the torque converter speed ratio and a ratio of turbine speed to engine speed:

$$T_{imp} = \frac{w_e^2}{K^2 \cdot \left(\frac{w_t}{w_e}\right)}$$

The capacity factor is typically determined experimentally. The routine then proceeds to step 300 wherein net engine torque is computed according to the following equation:

$$T_{net} = T_{imp} + T_{loss}$$

wherein $T_{loss}$ is the loss torque due to pump, accessory, and acceleration/deceleration losses.

Next, in step 400, an auxiliary torque that represents the difference between the indicated torque and the engine pumping torque is calculated:

$$T_{aux} = T_{net} - T_f$$

wherein $T_f$ is engine friction torque typically determined from a look-up table as a function of engine speed and engine coolant temperature. Proceeding now to step 500, $m_{cyl\_tc}$, torque converter-based cylinder air-charge estimate can be determined as a function of engine speed, spark timing, air-fuel ratio, and $T_{aux}$. The routine then proceeds to step 600, wherein $m_{cyl\_sensor}$, a MAP or MAF-sensor based estimate of the cylinder air-charge is obtained. Next, in step 700 the error between the two independent estimates (the sensor-based estimate and the torque converter-based estimate) is calculated according to the following equation:

$$e = m_{cyl\_tc} - a_1 \cdot m_{cyl\_sensor} - a_0$$

The routine then proceeds to step 800 wherein $a_1$ and $a_0$ are updated such that the error between the two torque estimates is minimized:

$$a_0 = a_0 + \gamma_0 \cdot e$$

$$a_1 = a_1 + \gamma_1 \cdot m_{cyl\_tc} \cdot e$$

wherein $\gamma_0$ and $\gamma_1$ are adaptation gains.

Next, in step 900, a corrected value of the sensor-based cylinder air-charge estimate is obtained:

$$m_{cyl\_corr} = a_1 \cdot m_{cyl\_sensor} + a_0$$

The routine then proceeds to step 1000 wherein a determination is made whether the difference between the sensor-based estimate and the torque-based estimate exceeds a predetermined value. If the answer to step 1000 is YES, sensor degradation is indicated and a diagnostic code is set in step 1100 set, and the routine exits. Alternatively, sensor decontamination can be performed by, for example, raising the temperature of the sensor and thus burning off the contaminants. If the answer to step 1000 is NO, the routine exits.

Thus, according to the present invention, it is possible to obtain a more accurate cylinder air-charge estimate by determining a torque converter-based correction value when the torque converter is unlocked, and using it to adjust the sensor-based estimate. Also, in-range drifting of the sensor can be diagnosed by comparing the two estimates and diagnosing sensor degradation, if the difference between them exceeds a predetermined value. Alternatively, sensor signal can be corrected directly by learning a correction value based on the torque converter characteristics and this corrected value can then be used to obtain a more accurate cylinder air-charge estimate.

This concludes the description of the invention. The reading of it by those skilled in the art would bring to mind many alterations and modifications without departing from the spirit and the scope of the invention. Accordingly, it is intended that the scope of the invention be defined by the following claims:

What is claimed is:

1. A method for diagnosing a sensor in a vehicle having an engine coupled to a transmission, the vehicle further having a torque converter coupled between the engine and the transmission, the method comprising:

determining a first estimate of a transmission input torque based on a torque converter characteristic;

determining a second estimate of said input torque based on a sensor signal; and providing an indication of sensor degradation based on a comparison of said first estimate and said second estimate.

2. The method as set forth in claim 1 wherein said transmission is a continuously variable transmission.

3. The method as set forth in claim 1 wherein said first estimate is determined when a torque converter clutch is unlocked.

4. The method as set forth in claim 1 wherein said torque converter characteristic is a capacity factor.

5. The method as set forth in claim 1 wherein said first estimate is further based on a ratio of turbine speed to engine speed.

6. The method as set forth in claim 1 wherein the sensor is a mass airflow sensor.

7. The method as set forth in claim 1 wherein the sensor is a manifold air pressure sensor.

8. The method as set forth in claim 5 wherein said second estimate is further based on engine speed.

9. The method as set forth in claim 1 wherein said indication is provided when a difference between said first estimate and said second estimate exceeds a predetermined value.

10. The method as set forth in claim 1 wherein said first estimate is further based on a ratio of an engine speed and a transmission input speed.

11. The method as set forth in claim 1 further comprising adjusting said sensor signal based on said first estimate.

12. The method as set forth in claim 1 further comprising decontaminating said sensor in response to said indication.

13. The method as set forth in claim 12 wherein said decontamination is achieved by raising a temperature of said sensor above a preselected value thus burning off contaminants.

* * * * *